United States Patent
Carpenter et al.

(10) Patent No.: US 6,629,479 B2
(45) Date of Patent: Oct. 7, 2003

(54) ON-CAR BRAKE LATHE HAVING IMPROVED SUPPORT TROLLEY

(75) Inventors: David M. Carpenter, Brentwood, TN (US); Melvin R. Willis, Readyville, TN (US)

(73) Assignee: Hennessy Industries, Inc., LaVergne, TN (US)

( * ) Notice: Subject to any disclaimer, the term of this patent is extended or adjusted under 35 U.S.C. 154(b) by 42 days.

(21) Appl. No.: 09/781,460

(22) Filed: Feb. 12, 2001

(65) Prior Publication Data

US 2002/0112575 A1 Aug. 22, 2002

(51) Int. Cl.[7] .............................. B23B 5/04; F16M 11/00
(52) U.S. Cl. ....................................... 82/112; 248/162.1
(58) Field of Search ........................ 82/112; 267/64.14, 267/64.28; 188/316; 297/344.19; 248/162.1, 622, 630, 631

(56) References Cited

U.S. PATENT DOCUMENTS

| 4,493,231 | A | * | 1/1985 | Wossner ...................... 82/112 |
|---|---|---|---|---|
| 4,653,710 | A | | 3/1987 | Dickison |
| 5,265,486 | A | * | 11/1993 | Hartman et al. .......... 248/278.1 |
| 5,279,192 | A | * | 1/1994 | Hartman ...................... 279/102 |
| 5,499,563 | A | * | 3/1996 | Hansen ......................... 82/112 |
| 5,549,023 | A | * | 8/1996 | Strout et al. .................. 82/112 |
| 5,653,153 | A | * | 8/1997 | Greenwald ................... 82/1.11 |
| 5,740,997 | A | | 4/1998 | Van Wieran |
| 6,340,153 | B1 | * | 1/2002 | Miesner ....................... 188/316 |
| 6,363,821 | B1 | * | 4/2002 | Greenwald et al. .......... 82/1.11 |

OTHER PUBLICATIONS

General Tools, RobinAir. http://www.robinair.com/products/general.pdf (Schrader trademark reference).*

* cited by examiner

*Primary Examiner*—A. L. Wellington
*Assistant Examiner*—Brian D. Walsh
(74) *Attorney, Agent, or Firm*—Nelson Mullins Riley & Scarborough

(57) ABSTRACT

A trolley is provided for supporting and portably moving an on-car brake lathe. The trolley includes wheels for mobility and a pneumatic cylinder for height adjustment. The pneumatic cylinder includes a piston rod, piston, and air valve. The piston has an equalizing port for dampened movement throughout the cylinder's stroke. The air valve allows static height adjustment of the lathe.

17 Claims, 2 Drawing Sheets

ON-CAR BRAKE LATHE HAVING IMPROVED SUPPORT TROLLEY

BACKGROUND OF THE INVENTION

The present invention relates generally to equipment for servicing vehicle brakes. More particularly, the present invention relates to an on-car brake lathe having an improved support trolley.

It is well-known that the brake rotors of a disc brake must be periodically resurfaced in order to maintain optimum braking capacity. Traditionally, brake rotors have been resurfaced using a bench-mounted lathe. This process requires removing the rotor from the vehicle, machining the surface of the rotor on the bench-mounted lathe, and reinstalling the rotor. As one skilled in the art will appreciate, such a process requires substantial time and labor.

Unlike a bench lathe, an on-car brake lathe does not require removal of the brake rotor from the vehicle. Instead, the lathe device is attached to the vehicle hub so as to machine the rotor in place. An example of an on-car lathe is described in U.S. patent application Ser. No. 09/611,535, assigned to the assignee of the present application, and incorporated here by reference.

A typical on-car lathe weighs 60–100 pounds and includes a motor and drive shaft for turning the rotor, as well as cutting tools for machining the rotor surface. In addition, the on-car lathe includes a mechanism for attaching the lathe to the hub and aligning the lathe with the hub. That is, the drive shaft of the lathe motor should rotate about the same axis as the hub so the cutting tools will machine the rotor surface perpendicular to the hub's axis of rotation.

In practice, the on-car brake lathe must be mounted on the hub of a vehicle that is elevated on a hydraulic lift in a garage. Therefore, to be functional, the operator must be able to maneuver the lathe around the garage between various obstacles, such as other vehicles. In addition, the operator must raise or lower the lathe and change the orientation of the lathe to facilitate convenient and accurate alignment with the hub.

Current lathe support systems for on-car brake lathes generally employ a three spoke base with wheels for movement. Either a counterbalance or mechanical support structure is provided to adjust the height to facilitate attachment of the lathe to the vehicle.

A counterbalance support system uses a spring or gas shock located in a vertical telescoping structure to counterbalance the weight of the lathe at a single height. Although a counterbalance system is adequate for a single height, considerable operator effort is required to position the lathe at a height other than the equilibrium.

A mechanical support system uses a screw, ratchet, or hydraulic piston to raise or lower the lathe. Although this type of support system allows the operator to adjust the static height of the lathe, the adjustment is cumbersome, slow, and rigid.

SUMMARY OF THE INVENTION

The present invention recognizes and addresses the needs discussed above and others of prior art constructions and methods. Accordingly, it is an object of the present invention to provide an improved support trolley for an on-car brake lathe.

It is an additional object of the present invention to provide a support trolley that allows the operator to smoothly raise or lower an on-car brake lathe.

It is also an object of the present invention to provide a support trolley in which the nominal support height can be easily adjusted by an operator.

Some of these objects are achieved by an apparatus comprising an on-car brake lathe device and a trolley supporting the on-car brake lathe device. The trolley has a cylinder assembly including a cylinder housing, a piston located within the cylinder housing and a piston rod attached to the piston. The on-car brake lathe device is connected to the trolley such that relative reciprocative movement between the piston and the cylinder housing causes raising and lowering of the on-car brake lathe device. The piston defines an equalizing port for gas communication between an upper chamber and a lower chamber of the cylinder housing.

In some exemplary embodiments, the cylinder includes valve means for introducing and releasing air from the cylinder housing. For example, the valve means may comprise a SCHRADER® style valve.

Often, the trolley may further include a base structure and a mounting structure to which the on-car brake lathe is connected. The cylinder assembly is located between the base structure and the mounting structure. In many cases, the cylinder will be inverted such that a distal end of the piston rod is attached to the base structure. The cylinder housing, in turn, is attached to the mounting structure in such embodiments.

In some cases, the mounting structure may comprise an offset member adapted so that the on-car brake lathe will be located directly above the cylinder assembly. In addition, it will often be desirable to configure the apparatus such that the on-car brake lathe device will be pivotally connected to the trolley. A locking mechanism may be provided to lock the on-car brake lathe device in a selected pivoted position.

Other objects of the present invention are achieved by a trolley for supporting and positioning a piece of equipment. The trolley comprises a base structure and a mounting structure to which the piece of equipment is connected. A cylinder assembly is connected between the base structure and the mounting structure. The cylinder assembly includes a cylinder housing, a piston located within the cylinder housing and a piston rod attached to the piston. The piston separates first and second gas chambers in the cylinder housing. In addition, the piston defines an equalizing port to permit gas communication between the first and second chambers.

Other objects, features and aspects of the present invention are provided by various combinations and subcombinations of the disclosed elements, as well as methods for practicing the same, which are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures, in which.

Figure 1:
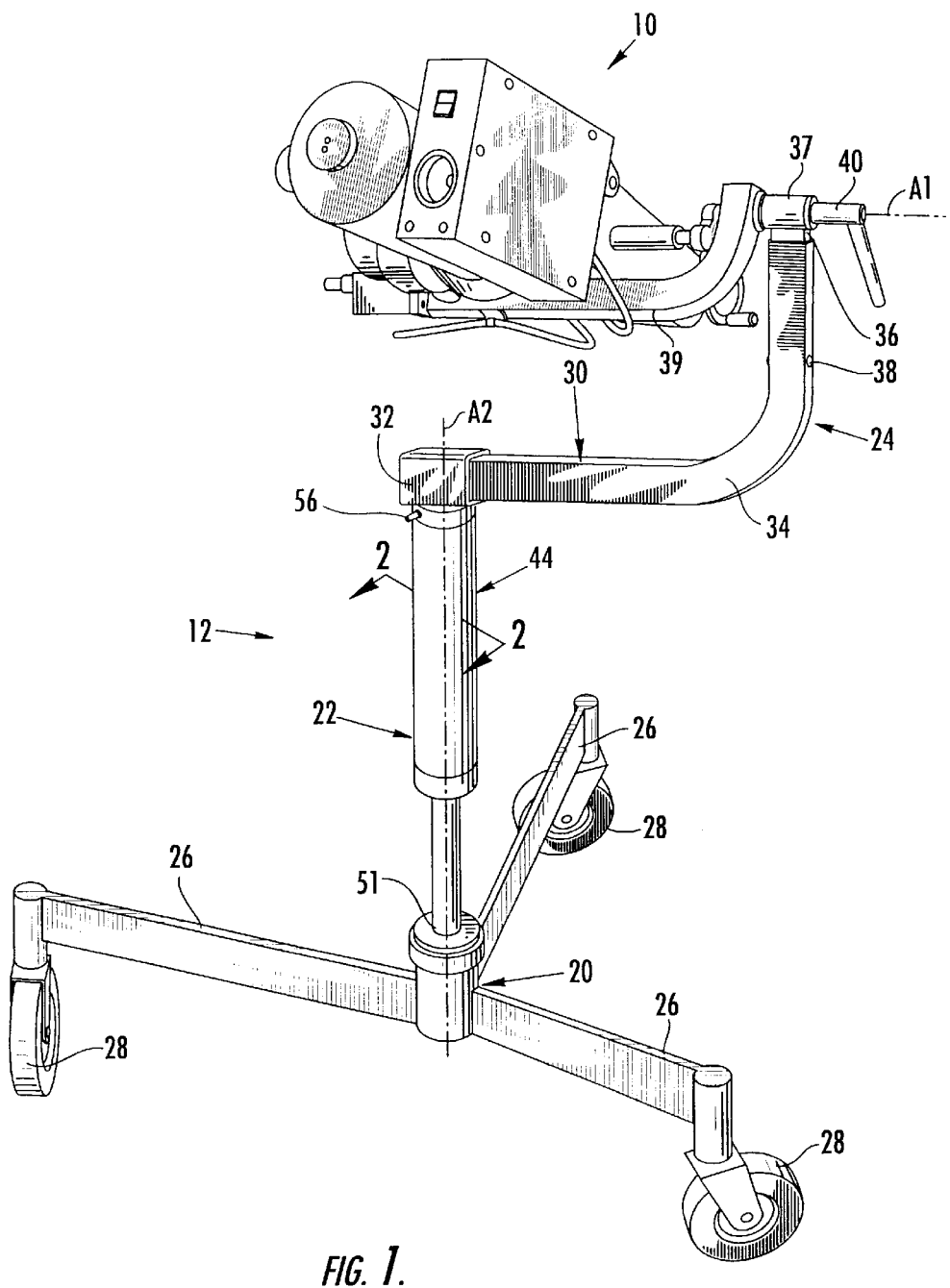
FIG. 1 is a perspective view of an apparatus constructed in accordance with the present invention.

Repeat use of reference characters in the present specification and drawings is intended to represent the same or analogous features or elements of embodiments of the invention.

DETAILED DESCRIPTION OF PREFERRED EMBODIMENTS

It is to be understood by one of ordinary skill in the art that the present discussion is a description of exemplary embodiments only and is not intended to limit the broader aspects of the present invention even though broader aspects are embodied in the present invention.

FIG. 1 illustrates an embodiment of a brake lathe 10 installed on a trolley 12 of the present invention. Trolley 12 generally comprises a base 20, an intermediate support structure 22, and an upper mounting assembly 24. Base 20 includes a plurality of legs 26 that extend radially outward from a common center. Caster wheels 28 are located at the distal end of each leg 26 to facilitate movement of the trolley from place to place.

As can be seen, mounting structure 24 includes an offset arm 30 having one end attached, as indicated at 32, to the upper portion of support structure 22. Offset arm 30 includes a main arm portion 34 into which a telescoping member 36 is received. Telescoping member 36 may be raised or lowered to a desired vertical position and secured via bolt 38 or other suitable securement means.

Telescoping member 36 defines a pivot support 37 to which a mounting arm 39 is connected. Brake lathe 10 is, in turn, located on mounting arm 39. As one skilled in the art will appreciate, the coupling between mounting arm 39 and brake lathe 10 can utilize any one or combination of several known methods such as welding, bolting, clamping and the like. Because brake lathe 10 is located on mounting arm 39, it can be easily rotated about an axis A1. A locking mechanism 40 is provided so that an operator can lock brake lathe 10 in the desired angular orientation.

Figure 2:
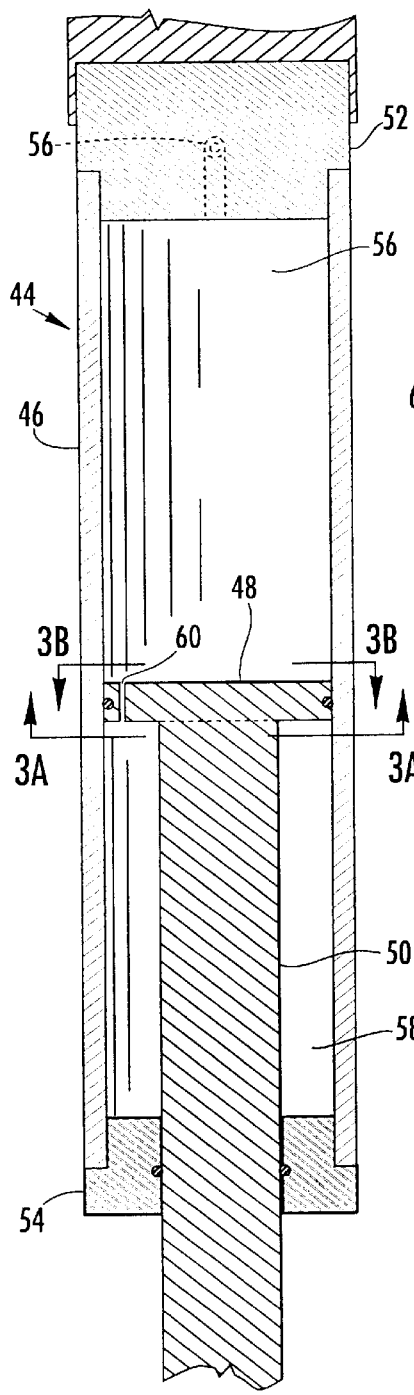
FIG. 2 is a cross-section of the pneumatic cylinder taken along line 2—2 of FIG. 1.

Referring now also to FIG. 2, support structure 22 includes a cylinder assembly 44 having a cylinder housing 46 in which a piston 48 is located. The proximal end of a piston rod 50 is secured to piston 48. The distal end of piston rod 50 is secured to base 20, as indicated at 51 in FIG. 1. As a result of this "inverted" arrangement, piston 48 will remain fixed as cylinder housing 46 undergoes reciprocative movement in the vertical direction. Preferably, cylinder assembly 44 will also be constructed such that cylinder housing 46 (and all supported components) can be rotated relative to piston 48 about axis A2 (FIG. 1).

Cylinder housing 46 includes respective end caps 52 and 54 so as to define a closed volume. It can be seen that piston rod 50 extends through a hole defined in bottom end cap 54. The interface between piston rod 50 and bottom end cap 54 includes an o-ring or other suitable seal to prevent gas communication between the interior of cylinder housing 46 and the outside environment.

As can be most easily seen in FIG. 1, a valve fitting 56 is preferably provided for changing the quantity of gas in the cylinder housing. Preferably, fitting 56 may be a valve similar to that used on most inflatable tires having a valve fitting that opens when depressed (commonly referred to as a SCHRADER®style valve). This allows the operator to add air to increase the pressure in the cylinder using an air hose which is readily available in most repair garages. Fitting 56 also allows the operator to easily bleed air to reduce pressure inside the cylinder housing.

Figure 3A:
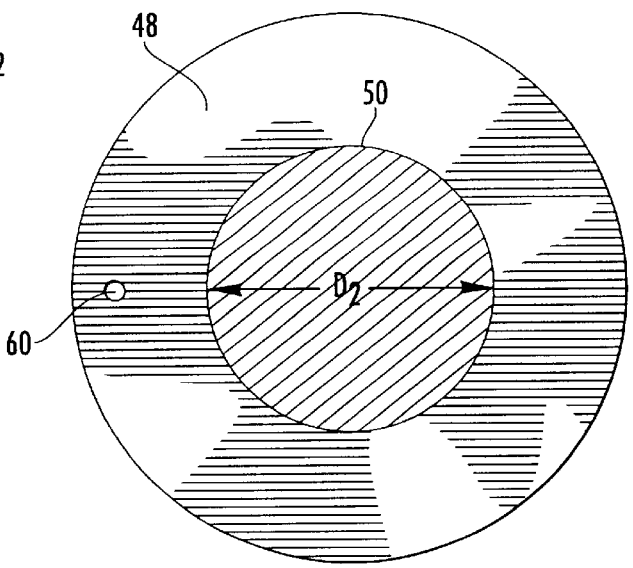
FIG. 3A is a view of the piston taken along line 3A—3A of FIG. 2.
Figure 3B:
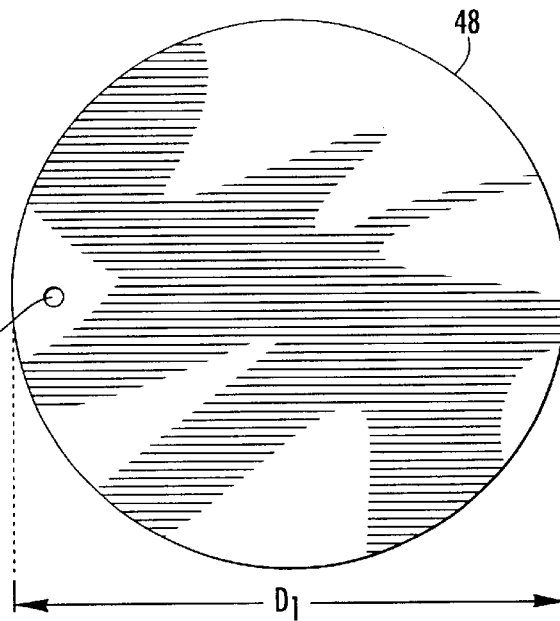
FIG. 3B is a view of the piston taken along line 3B—3B of FIG. 2.

FIGS. 2, 3A and 3B are useful in explaining the operation of support structure 22. Preferably, the diameter D2 of piston rod 50 may be relatively large compared to the diameter D1 of the piston. As can be seen, piston 48 separates the cylinder volume into an upper chamber 56 and a lower chamber 58. A small equalizing port 60 is defined in piston 48 to allow gas communication between chambers 56 and 58. As a result, the gas pressure in the respective chambers will be equal.

Assume initially that the support structure 22 is at equilibrium. At equilibrium, the height of cylinder housing 46 is static, and the air pressure above piston 48 exactly equals the air pressure below piston 48. Additionally, the net upward force produced by the air inside of cylinder housing 46 exactly equals the weight being supported by support structure 22 (i.e., the weight of the lathe, mounting structure and cylinder housing).

From this initial equilibrium, assume the operator pushes down so as to lower the lathe. The operator's action causes cylinder housing 46 to also move down relative to the fixed piston. As cylinder housing 46 moves down, the total volume that may be occupied by air inside of cylinder housing 46 is decreased. This is because a longer portion of piston rod 50 will now be located inside of cylinder housing 46. As a result, the pressure exerted by the air inside of cylinder housing 46 will increase and a greater net force in the upward direction will be produced.

Thus, downward movement of cylinder housing 46 produces a net increase in the supporting force which serves to oppose further downward movement. This damping characteristic provides for smooth movement of mounting assembly 24 in response to vertical forces. If the operator stops pushing down on mounting assembly 24, the forces and reactions will be reversed. Cylinder housing 46 then returns to the original equilibrium height.

If the operator desires to raise the equilibrium height of lathe 10, air is simply introduced into cylinder housing 46 through fitting 56. The charged air increases the pressure within cylinder housing 46, thus increasing the net upward force. Cylinder housing 46 will then move in the upward direction so as to increase the internal volume that can be occupied by air. Eventually, cylinder housing 46 reaches a new, higher equilibrium height. The equilibrium height may be similarly lowered by bleeding air from cylinder housing 46.

It can thus be seen that the present invention provides a brake lathe device having an improved support trolley in furtherance of the noted objects. The pneumatic cylinder not only statically supports the lathe at an adjustable height, but it also facilitates smooth raising and lowering of the lathe in order to match the height of the vehicle's hub. The air fitting on the cylinder permits the operator to change the air pressure in the cylinder to change the static height of the lathe. The piston's equalizing port permits the cylinder to mechanically assist the vertical movement of the lathe throughout the cylinder's entire stroke.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An apparatus comprising:

an on-car brake lathe device;

a trolley supporting said on-car brake lathe device;

said trolley having a cylinder assembly including a cylinder housing, a piston located within said cylinder housing and a piston rod rigidly attached to said piston;

said piston rod extending through a hole defined in said cylinder housing, said hole including a seal slidingly engaging an outer surface of said piston rod;

said on-car brake lathe device being connected to said trolley such that relative reciprocative movement between said piston and said cylinder housing causes raising and lowering of said on car brake lathe device; and said piston defining an equalizing port for gas communication between an upper chamber and a lower chamber of said cylinder housing.

2. The apparatus as in claim 1, wherein said cylinder includes valve means for introducing and releasing air from said cylinder housing.

3. The apparatus as in claim 2, wherein said valve means comprises a valve having a valve fitting that opens when depressed.

4. The apparatus as in claim 1, wherein said trolley further includes:

a base structure;

a mounting structure to which said on car brake lathe is connected; and said cylinder assembly being located between said base structure and said mounting structure.

5. The apparatus as in claim 4, wherein said cylinder assembly is inverted such that a distal end of said piston rod is attached to said base structure and said cylinder housing is attached to said mounting structure.

6. The apparatus as in claim 5, wherein said mounting structure is rotatable with respect to said base structure about a longitudinal axis of said cylinder assembly.

7. The apparatus as in claim 4, wherein said mounting structure comprises an offset member adapted so that said on car brake lathe will be located directly above said cylinder assembly.

8. The apparatus as in claim 7, wherein said on car brake lathe device is pivotally connected to said trolley.

9. The apparatus as in claim 8, wherein said trolley includes a locking mechanism operative to lock said on car brake lathe device in a selected pivoted position.

10. The apparatus as in claim 1, wherein said trolley includes a base structure having wheels mounted thereon to facilitate movement of said on car brake lathe.

11. A trolley for supporting and positioning a piece of equipment, said trolley comprising:

a base structure;

a mounting structure to which said piece of equipment is connected;

a cylinder assembly connected between said base structure and said mounting structure;

said cylinder assembly including a cylinder housing, a piston having a first side and a second side and being located within said cylinder housing, and a piston rod attached to said second side of said piston such that said first side of said piston has a first surface area and said second side of said piston has a second surface area, said first surface area being greater than said second surface area;

wherein said piston separates first and second fluid chambers in said cylinder housing respectively bounded by said first and second sides of said piston, said piston defining an equalizing port to permit gas communication between said first and second chambers such that fluid pressure on both sides of said piston will be equal but will be respectively applied to said first surface area and said second surface area so as to maintain said mounting structure at a selected height.

12. The trolley as in claim 11, wherein said cylinder includes valve means for introducing and releasing air from said cylinder housing.

13. The trolley as in claim 12, wherein said valve means comprises a valve having a valve fitting that opens when depressed.

14. The trolley as in claim 11, wherein said cylinder assembly is inverted such that a distal end of said piston rod is attached to said base structure and said cylinder housing is attached to said mounting structure.

15. The trolley as in claim 11, wherein said mounting structure comprises an offset member adapted so that said piece of equipment will be located directly above said cylinder assembly.

16. The trolley as in claim 11, wherein said base structure has wheels mounted thereon to facilitate movement of said piece of equipment.

17. The trolley as in claim 11, wherein said mounting structure is rotatable with respect to said base structure about a longitudinal axis of said cylinder assembly.

* * * * *